United States Patent [19]
Slack et al.

[11] Patent Number: 5,753,750
[45] Date of Patent: May 19, 1998

US005753750A

[54] TOLUENE DIISOCYANATE RESIDUE-BASED COMPOSITIONS AS FILLERS FOR POLYISOCYANATES

[75] Inventors: William E. Slack, Moundsville, W. Va.; Jyothi S. Pisipati, Wexford, Pa.

[73] Assignee: Bayer Corporation, Pittsburgh, Pa.

[21] Appl. No.: 777,316

[22] Filed: Dec. 27, 1996

[51] Int. Cl.$^6$ .................. C08K 5/205; C08K 5/29; C08L 75/04; C08G 18/72

[52] U.S. Cl. .............. 524/728; 252/182.2; 252/182.21; 252/182.22; 521/40.5; 521/49.5; 524/196; 524/198; 524/199; 525/452; 525/453; 525/457; 525/458; 525/460; 528/49; 528/59; 528/67; 528/76; 528/80; 528/85; 560/24; 560/25; 560/26; 560/330; 560/336; 560/360

[58] Field of Search .................. 252/182.2, 182.21, 252/182.22; 524/196, 198, 199, 728; 525/452, 453, 457, 458, 460; 560/24, 25, 26, 330, 336, 360; 521/40.5, 49.5; 528/49, 67, 59, 76, 80, 85

[56] References Cited

U.S. PATENT DOCUMENTS

| | | | |
|---|---|---|---|
| 3,455,836 | 7/1969 | Shultz et al. ........................ | 252/182 |
| 4,293,456 | 10/1981 | Reischl ............................... | 524/589 |
| 4,297,456 | 10/1981 | Reischl et al. ...................... | 525/452 |
| 4,480,081 | 10/1984 | Rosin et al. ........................ | 528/49 |
| 4,507,464 | 3/1985 | Rasshofer .......................... | 528/288 |
| 4,904,704 | 2/1990 | Nafziger et al. ................... | 521/156 |
| 5,185,384 | 2/1993 | Daussin et al. .................... | 521/160 |
| 5,216,042 | 6/1993 | Daussin et al. .................... | 521/160 |
| 5,290,818 | 3/1994 | Nafziger et al. ................... | 521/54 |

*Primary Examiner*—Rabon Sergent
*Attorney, Agent, or Firm*—Joseph C. Gil; Lyndanne M. Whalen

[57] ABSTRACT

TDI residue-based urethane-filled isocyanate compositions are produced by reacting a TDI residue satisfying specified criteria with a monofunctional alcohol in amounts such that the equivalent ratio of isocyanate groups to hydroxyl groups is from about 0.9:1 to about 1:0.9. This reaction product is then dissolved in a diisocyanate or polyisocyanate. These TDI residue-based urethane-filled isocyanate compositions are particularly useful in the production of polyurethanes.

13 Claims, No Drawings

TOLUENE DIISOCYANATE RESIDUE-BASED COMPOSITIONS AS FILLERS FOR POLYISOCYANATES

BACKGROUND OF THE INVENTION

The present invention relates to a toluene diisocyanate ("TDI") residue-filled polyisocyanate, to a process for the production of a polyisocyanate filled with a TDI residue-based urethane, to polyurethane prepolymers produced from these urethane filled isocyanates and to polyurethanes produced from polyisocyanates filled with TDI residue-based urethanes.

TDI is generally produced by phosgenating toluene diamine ("TDA"). In the course of producing TDI by this process, a non-distillable by-product which is commonly referred to as "TDI residue" or "TDI bottoms" is generated. The amount of this by-product generated during phosgenation is dependent upon the amount of ortho-toluene diamine ("o-TDA") present in the amine starting material and the phosgenation conditions. Major concerns in the production of TDI are, therefore, the amount of TDI residue generated and whether such TDI residue is useful in other applications.

The usefulness of a TDI residue is largely dependent upon the heat history of that residue. That is, the longer the residue has been subjected to high heat to remove monomeric TDI, the more difficult it becomes to work with that by-product. It has generally been found that after the TDI monomer content of the TDI residue has been reduced to a level below 10%, the remaining residue is a solid at ambient temperature and is insoluble in the commonly used solvents. Consequently, TDI residues containing less than 10% monomeric TDI are not generally considered useful and are disposed of by incineration.

The desirability of using the large quantities of TDI residue generated during TDI production is evident from the prior art.

U.S. Pat. No. 3,455,836, for example, teaches addition of TDI residue to 4,4'-diphenylmethane diisocyanate which has been heated to a temperature high enough to liquify the normally solid material to produce a stable isocyanate composition having a low viscosity at room temperature.

U.S. Pat. No. 4,293,456 teaches that use of finely ground solid TDI residue as a reactive filler which is substantially free of monomeric TDI (i.e., generally contains from 1 to 10% monomeric TDI) may be used to produce polyurethane plastics. This process thus makes it possible to recycle the previously unusable TDI residue and to improve the mechanical properties of plastics made with that finely ground residue.

The TDI residue used in this process may be water quenched and denatured or chemically modified by reaction with carbonyl compounds, compounds reactive to isocyanate groups, or carbodiimide groups. The TDI residue must, however, be size reduced to less than 3 mm before it can be used.

U.S. Pat. No. 4,297,456 also teaches that TDI residue which is substantially free of monomeric TDI (i.e., contains less than 7.5% monomeric TDI) and insoluble in organic solvents may be used in the production of molded articles and elastomers if that TDI residue is first comminuted to a mean particle size of less than 800 mμ. This TDI residue may be modified during or after grinding by reaction with water, an amine, ammonia, a compound containing hydroxyl groups or a compound containing carboxyl groups.

U.S. Pat. No. 4,507,464 teaches that a liquid isocyanate residue may be obtained by phosgenating a primary polyamine such as TDA in the presence of a compound selected from a specified group and having at least one primary or secondary alcoholic hydroxyl group. The amine and hydroxyl-group containing compound are used in quantities such that the equivalent ratio of primary amino groups to hydroxyl groups is from 1:0.005 to 1:0.99 during the phosgenation. The residue remaining after the desired isocyanate prepolymer has been removed is a liquid.

U.S. Pat. No. 4,904,704 discloses a method for treating TDI with an epoxy compound at temperatures of from about 155° to about 220° C. in order to obtain a material useful for the production of polyurethane foams. The treated TDI can not, however, be stored at ambient temperature without solidifying. The treated TDI may be diluted with another polyisocyanate prior to use in the production of foams in order to adjust the viscosity of the isocyanate.

U.S. Pat. No. 5,185,384 discloses a method for reducing the hydrolyzable chloride content in TDI and TDI distillation bottoms in which crude TDI is heated to cause at least partial reflux and/or partial fractionation under conditions sufficient to reduce hydrolyzable chloride. The TDI distillation bottoms may then be used directly in the production of polyurethanes or they may be combined with another polyisocyanate prior to production of a polyurethane.

U.S. Pat. No. 5,290,818 discloses a process for producing rebond foam in which the binder includes TDI distillation bottoms having a monomeric TDI content of from 20 to 30%.

It would be advantageous to develop a method for making TDI distillation residue sufficiently soluble in polyisocyanates that it could be made a liquid at ambient temperature without leaving economically impractical amounts of monomeric TDI in that residue.

SUMMARY OF THE INVENTION

It is an object of the present invention to provide a polyisocyanate filled with a TDI residue-based urethane which is storage stable at ambient temperature.

It is also an object of the present invention to provide a method for producing a liquid TDI residue-based urethane filled polyisocyanate.

It is another object of the present invention to provide a liquid, clear, urethane-filled polyisocyanate which has been produced from TDI residue.

It is an additional object of this invention to provide a clear, liquid urethane-filled polyisocyanate prepolymer which has been produced from TDI residue.

It is a further object of the present invention to provide a process for producing polyurethanes, particularly polyurethane foams, from a liquid, clear, urethane-filled polyisocyanate that has been produced from TDI residue.

These and other objects which will be apparent to those skilled in the art are accomplished by selecting a TDI residue generated by phosgenation of TDA in which the o-TDA content was less than 0.5%.

The TDI residue to be used in the present invention also contains at least 10% by weight monomeric TDI. The total NCO content of monomeric TDI and any other isocyanate-group containing material present in the TDI residue is at least 20%. TDI residue satisfying these criteria and a monofunctional alcohol are reacted in amounts such that the equivalent ratio of isocyanate groups to hydroxyl groups is from about 0.9:1.0 to about 1.0:0.9 to produce a urethane group-containing composition that is soluble in inert organic solvents, and in polyisocyanates at ambient temperature.

This urethane group containing composition is then dissolved in a polyisocyanate to produce a urethane-filled polyisocyanate. This urethane-filled polyisocyanate may then be used to produce urethane filled polyisocyanate prepolymers and polyurethanes.

DETAILED DESCRIPTION OF THE INVENTION

The present invention relates to a TDI residue-based urethane filled polyisocyanate, to a process for producing such polyisocyanate, to a process for the production of a urethane-filled polyisocyanate prepolymer and to a process for the production of a polyurethane from such a urethane-filled polyisocyanate. The urethane filled polyisocyanates of the resent invention are made by reacting a monofunctional alcohol and a TDI residue satisfying specific criteria in amounts such that the equivalent ratio of isocyanate groups to hydroxyl groups is from about 0.9:1 to about 1:0.9, preferably about 1:1. This reaction product is then dissolved in a polyisocyanate to produce a urethane-filled polyisocyanate. This urethane-filled polyisocyanate may then be reacted with an isocyanate-reactive compound to produce polyisocyanate prepolymers and polyurethanes.

The TDI residues useful in the practice of the present invention must satisfy the following criteria: (1) the residue must have been generated by the phosgenation of toluene diamine in which the o-TDA content was less than 0.5%, preferably less than 0.1%, most preferably about 0%; (2) the monomeric TDI content of the TDI residue must be at least 10% by weight; and (3) the total isocyanate group content of monomeric TDI and any other isocyanate group containing material present in the TDI residue must be at least 20%.

With respect to the first of these criteria, the o-TDA content of the polyamine to be phosgenated may easily be determined by methods known to those skilled in the art such as gas chromatography. If the o-TDA content of the TDA is greater than 0.5%, the TDA may be treated (e.g., by fractional distillation) to reduce the level of o-TDA to an acceptable level.

The phosgenation of TDA may be carried out by any of the methods known to those skilled in the art. Upon completion of that phosgenation, monomeric TDI is generally removed from the reaction mixture by distillation. In accordance with the present invention, the reaction mixture may be distilled until up to 90% of the monomeric TDI has been removed. The remaining residue which contains at least 10% by weight monomeric TDI, preferably at least 15% but no more than 80% by weight monomeric TDI, and most preferably from about 20 to about 50% by weight monomeric TDI and which has a total NCO content of at least 20%, preferably from about 24 to about 40%, most preferably from about 26 to about 34% is suitable as a starting material for the process of the present invention. It is preferred, but not required, that any solvent employed in the phosgenation process be removed prior to use of the TDI residue in accordance with the present invention.

Any of the known monofunctional alcohols (i.e., compounds containing one alcoholic hydroxyl group) may be reacted with the TDI residue satisfying the criteria of the present invention. Such mono-functional alcohols generally have a molecular weight of from about 32 to about 1,000, preferably from about 60 to about 400. Suitable monofunctional alcohols include compounds having a carbon backbone such as cetyl alcohol (16 carbons) as well as compounds which contain groups that will not react with isocyanate groups such as ether linkages, tertiary amines, chlorine, bromine, etc. Mixtures of such monofunctional alcohols may also be used.

Examples of suitable monofunctional alcohols include: methanol, dimethyl ethanolamine, ethanol, 1-propanol, 2-propanol, 1-butanol, 1-hexanol, 1-decanol, 1-octadecanol, cyclohexanol, 2-phenylethanol, 1-phenoxy-2-propanol, and ethylene oxide/propylene oxide-extended alcohols.

In addition to the monohydric alcohol, a polyhydroxyl compound may also be reacted with the TDI residue satisfying the criteria of the present invention. Any of the known polyhydroxyl compounds may be used, provided that the polyhydroxyl compound does not contribute more than 80% of the hydroxyl groups present in the mixture to be reacted with the TDI residue. Particularly suitable polyhydroxyl compounds include polyether polyols, polyester polyols and short chain diols.

Polyether polyols useful in the practice of the present invention typically have functionalities of from about 2 to about 6, preferably from about 2 to about 3, and molecular weights (number average determined by end group analysis) of from about 100 to about 6,000, preferably from about 150 to about 5,000. Examples of such polyether polyols include those obtained in known manner by reacting one or more starting compounds which contain reactive hydrogen atoms with alkylene oxides such as ethylene oxide, propylene oxide, butylene oxide, styrene oxide, tetrahydrofuran, epichlorohydrin or mixtures of these alkylene oxides. Polyethers obtained by addition of ethylene oxide and/or propylene oxide are most preferred. Suitable starting compounds containing reactive hydrogen atoms include polyhydric alcohols (described below as being suitable for preparing polyester polyols); water; methanol; ethanol; 1,2,6-hexane triol; 1,2,4-butane triol; trimethylol ethane; pentaerythritol; mannitol; sorbitol; methyl glycoside; sucrose; phenol; isononyl phenol; resorcinol; hydroquinone; and 1,1,1- or 1,1,2-tris-(hydroxylphenyl)-ethane.

Polyester polyols useful in the practice of the present invention typically have functionalities of about 2 and molecular weights (number average determined by end group analysis) of from about 200 to about 2,000, preferably from about 400 to about 1,000. Examples of such polyester polyols include the reaction products of polyhydric alcohols (preferably dihydric alcohols to which trihydric alcohols may be added) and polybasic (preferably dibasic) carboxylic acids. In addition to these polycarboxylic acids, corresponding carboxylic acid anhydrides or polycarboxylic acid esters of lower alcohols or mixtures thereof may also be used to prepare the polyester polyols useful in the practice of the present invention. The polycarboxylic acids may be aliphatic, cyclo-aliphatic, aromatic and/or heterocyclic and they may be substituted, e.g., by halogen atoms, and/or unsaturated. Examples of suitable polycarboxylic acids include: succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydro-phthalic acid anhydride; glutaric acid anhydride; maleic acid; maleic acid anhydride; fumaric acid; dimeric and trimeric fatty acids such as oleic acid, which may be mixed with monomeric fatty acids; dimethyl terephthalates and bis-glycol terephthalate. Suitable polyhydric alcohols include: ethylene glycol; 1,2- and 1,3-propylene glycol; 1,3- and 1,4-butylene glycol; 1,6-hexanediol; 1,8-octanediol; neopentyl glycol; cyclohexanedimethanol; (1,4-bis(hydroxymethyl) cyclohexane); 2-methyl-1,3-propanediol; 2,2,4-trimethyl-1, 3-pentanediol; triethylene glycol;

tetraethylene glycol; polyethylene glycol; dipropylene glycol; poly-propylene glycol; dibutylene glycol and poly-butylene glycol; and glycerine and trimethylolpropane. The polyesters may also contain a portion of carboxyl end groups. Polyesters of lactones, e.g., ω-caprolactone or hydroxyl carboxylic acids such as co-hydroxycaproic acid, may also be used.

Short chain diols useful in the practice of the present invention typically have molecular weights of from about 62 to about 400. Examples of suitable diols include: 1,3-butanediol, 1,2-propylene glycol, ethylene glycol, and N-methyl-diethanolamine.

The TDI residue satisfying the criteria of the present invention, a monofunctional alcohol and any optional polyol are reacted in amounts such that the equivalent ratio of isocyanate groups to hydroxyl groups is from about 0.9:1 to about 1:0.9, preferably about 1:1. This reaction may be carried out at temperatures of from about 40° to about 120° C., preferably from about 70° to about 100° C. at atmospheric pressure.

The reaction product is a urethane group containing TDI residue-based composition which is solid at ambient temperature but which is soluble in most of the commonly used organic solvents (e.g., toluene, ethylene chloride and tetrahydrofuran) and in polyisocyanates at ambient temperature. This reaction product may then be dissolved in a polyisocyanate to produce a TDI residue based urethane-filled polyisocyanate. The polyisocyanate in which the urethane group containing TDI residue is dissolved may be any of the known organic diisocyanates or polyisocyanates.

The amount of polyisocyanate in which the urethane group containing TDI residue is dissolved is generally determined on the basis of handling and processing considerations (e.g., viscosity). For most applications, however, the amount of polyisocyanate used is selected so that the dissolved urethane-group containing TDI residue will be present in the polyisocyanate in a quantity of from about 10 to about 50% by weight, based on the total weight of urethane group containing TDI residue plus polyisocyanate.

Diisocyanates and polyisocyanates in which the urethane group containing TDI residue may be dissolved include aliphatic, cycloaliphatic, araliphatic, aromatic and heterocyclic isocyanates, modified isocyanates and isocyanate-terminated prepolymers. Examples of such isocyanates include: diisocyanates such as m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,3-cyclohexane diisocyanate, 1,4-cyclohexane diisocyanate, hexahydro-toluene diisocyanate and its isomers, isophorone diisocyanate, dicyclohexylmethane diisocyanates, 1,5-naphthalene diisocyanate, 1-methyl-phenyl-2,4-phenyl diisocyanate, 4,4'-diphenylmethane diisocyanate, 2,4'-diphenylmethane diisocyanate, 4,4'-biphenylene diisocyanate, 3,3'-dimethoxy4,4'-biphenylene diisocyanate and 3,3'-dimethyl-4,4'-biphenylene diisocyanate; triisocyanates such as 2,4,6-toluene triisocyanate; and polyisocyanates such as 4,4'-dimethyl-diphenyl-methane-2,2',5,5'-tetraisocyanate and the polymethylene polyphenyl-polyisocyanates (polymeric MDI or "PMDI").

Modified isocyanates are obtained by chemical reaction of diisocyanates and/or polyisocyanates. Modified isocyanates useful in the practice of the present invention include isocyanates containing ester groups, urea groups, biuret groups, allophanate groups, carbodiimide groups, isocyanurate groups, uretdione groups and/or urethane groups.

Preferred examples of modified isocyanates include prepolymers containing NCO groups and having an NCO content of from about 25 to about 35% by weight, preferably from about 28 to about 32% by weight.

Prepolymers based on polyether polyols or polyester polyols and diphenylmethane diisocyanate are particularly preferred. Processes for the production of these prepolymers are known in the art.

The most preferred polyisocyanates for the production of the urethane filled polyisocyanates of the present invention are diphenyl methane diisocyanate (MDI), polymeric MDI, modified MDI, TDI and modified TDI.

The urethane filled polyisocyanates of the present invention are characterized by their clarity and low viscosity as compared to other polyisocyanates filled with known reactive fillers.

The urethane filled polyisocyanates of the present invention may be used to produce polyisocyanate prepolymers by reacting them with any of the known isocyanate reactive materials. These filled polyisocyanates are preferably reacted with polyols of the type described above as being suitable for use in combination with the monofunctional alcohol to treat the TDI residue in amounts such that the NCO/OH ratio is from about 4:1 to about 34:1 to produce urethane-filled polyisocyanate prepolymers.

Low molecular weight isocyanate-reactive materials may also be used to produce urethane-filled polyisocyanate prepolymers from the urethane filled polyisocyanates of the present invention. Suitable low molecular weight isocyanate-reactive compounds include polyhydric alcohols which have previously been described in the process for the preparation of the polyester polyols and polyether polyols. Dihydric alcohols are preferred.

Monofunctional and even small amounts of trifunctional and higher functional compounds generally known in polyurethane chemistry may be used to produce prepolymers in accordance with the present invention. For example, trimethylolpropane may be used in special cases in which slight branching is desired.

Catalysts, surfactants, blowing agents and additives may be used to aid the polyurethane-forming reaction. Examples of catalysts useful for promoting urethane reactions include tertiary amines, di-n-butyl tin dichloride, di-n-butyl tin diacetate, di-n-butyl tin dilaurate, triethylene-diamine, bismuth nitrate. Non-ionic surfactants and wetting agents may also be included in the polyurethane-forming reaction mixture. Examples of suitable blowing agents include: methylene chloride, acetone, pentane, hexane and carbon dioxide. Other suitable additives include: foam stabilizers such as hydrophilic organosilicon compounds, particularly those having a polydimethyl siloxane group attached to a copolymer of ethylene and/or propylene oxide; mineral oil; antistatic agents; plasticizers; fillers; flame retardants; and pigments.

Having thus described our invention, the following Examples are given as being illustrative thereof. All parts and percentages given in these Examples are parts by weight and percentages by weight, unless otherwise indicated.

EXAMPLES

The materials used in the Examples which follow were:

| | |
|---|---|
| Alcohol A: | a 1-butanol started propylene oxide adduct having a molecular weight of 315 and a functionality of 1. |
| Alcohol B: | 1-butanol. |
| Alcohol C: | 2-ethyl-1-hexanol. |
| TPG: | tripropylene glycol. |
| Polyol A: | a propylene glycol/propylene oxide adduct having a functionality of 2 and a molecular weight of 2000. |
| Polyol B: | a propylene glycol/propylene oxide/ethylene oxide adduct having 20% terminal ethylene oxide, a functionality of 2 and a molecular weight of 4000. |
| Polyol C: | a polyoxypropylene triol modified with ethylene oxide having a molecular weight of 3000. |
| Isocyanate A: | a polyisocyanate made up of 44% by weight methylene diphenyl diisocyanate (42% of the 4,4'-isomer and 2% of the 2,4'-isomer) and 56% by weight higher homologs of methylene diphenyl diisocyanate having an NCO content of 31.5%. |
| TDI I: | TDI residue generated by phosgenating TDA containing 80% 2,4-TDA and 20% 2,6-TDA and no o-TDA. The monomeric TDI content of the residue was 27.2%, and the total NCO content was 27.8%. |
| TDI II: | TDI residue generated by phosgenating TDA containing 80% 2,4-TDA, 20% 2,6-TDA and no o-TDA. The monomeric TDI content of the residue was 38% and the total NCO content was 32.4%. |
| TDI III: | TDI residue generated by phosgenating TDA containing 80% 2,4-TDA, 20% 2,6-TDA and no o-TDA. The monomeric TDI content of the residue was 25.9% and the total NCO content was 29.5%. |

The procedure used in each of Examples 1 through 8 was as follows:

TDI RESIDUE was introduced into a 1 liter 3-necked flask equipped with a stirrer and thermometer in the amount indicated in Table 1. The TDI RESIDUE was stirred and to this stirred TDI RESIDUE was introduced the monofunctional alcohol and any optional polyol at 25° C. in the amount(s) indicated in Table 1. The resultant mixture was allowed to exotherm to 90° C. and then held at 90° C. until no NCO groups remained. The contents of the flask were then dissolved in the amount of Isocyanate A necessary to produce a product having the % by weight capped residue indicated in Table 1.

TABLE 1

| Example | TDI/g | Hydroxyl Compd./g | % Urethane Capped Residue in Isocyanate A | Viscosity mPa.s (25° C.) | NCO Content |
|---|---|---|---|---|---|
| 1 | TDI II/ 77.2 | Alcohol B/44 g | 15.0 | 810 | 26.7% |
| 2 | TDI II/ 100 g | Alcohol C/100 g | 33.5 | 2380 | 20.9% |
| 3 | TDI I/ 125 g | Alcohol A/261 g | 25.0 | 972 | 23.6% |
| 4 | TDI I/ 125 g | Alcohol A/195.5 g TPG/ 19.9 g | 20.0 | 876 | 25.1% |

TABLE 1-continued

| Example | TDI/g | Hydroxyl Compd./g | % Urethane Capped Residue in Isocyanate A | Viscosity mPa.s (25° C.) | NCO Content |
|---|---|---|---|---|---|
| 5 | TDI III/ 100 g | Alcohol B/44.1 g Polyol A/ 66.2 g | 24.7 | 2072 | 23.7% |
| 6 | TDI III/ 92.9 g | Alcohol B/22.8 g Polyol A/ 308 g | 24.6 | 3810 | 23.7% |
| 7 | TDI III/ 100 g | Alcohol B/38.3 g TPG/ 16.6 g | 31.8 | 37,400 | 21.4% |
| 8 | TDI III/ 100 g | Alcohol B/38.3 g TPG/ 16.6 g | 15.0 | 1616 | 26.7% |

Each of the urethane-filled polyisocyanates produced in these Examples was a clear liquid which was free of solids.

EXAMPLE 9

To a 500 ml three necked flask equipped with a stirrer and a thermometer was added 45.0 grams of TDI II. While stirring the contents of the flask, 25.5 grams of Alcohol B were added at 25° C. This mixture was allowed to exotherm to 90° C. and then held at 90° C. until no NCO groups remained (about 2 hours). The contents of the flask were then dissolved in 105.8 grams of toluene diisocyanate (80% 2,4-isomer and 20% 2,6-isomer) and held at 60° C. To this solution were added 212.6 grams of Polyol B and the reaction mixture was maintained at 60° C. for 2 hours. The product was a clear liquid having an NCO content of 11.9% and a viscosity of 1508 mPa-s at 25° C.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a urethane-filled, iisocyanate or polyisocyanate comprising
   a) reacting
      1) a toluene diisocyanate residue from the phosgenation of toluene diamine having an ortho-toluenediamine content of less than 0.5% which toluene diisocyanate residue contains at least 10% by weight monomeric toluene diisocyanate and has a total isocyanate group content of at least 20% with
      2) a monofunctional alcohol in amounts such that the equivalent ratio of isocyanate groups in 1) to hydroxyl groups in 2) is from about 0.9:1.0 to about 1.0:0.9
   and
   b) dissolving the product of a) in a diisocyanate or polyisocyanate.

2. The process of claim 1 in which a polyhydroxyl compound is present during the reaction in an amount such that at least 20% of the total hydroxyl groups present are hydroxyl groups from the monofunctional alcohol.

3. The process of claim 1 in which the monofunctional alcohol has a molecular weight of from about 32 to about 1000.

4. The process of claim 1 in which the monofunctional alcohol has a molecular weight of from about 60 to about 400.

5. The process of claim 1 in which the toluene diisocyanate residue has a total isocyanate group content of at least 25%.

6. The process of claim 1 in which the toluene diisocyanate residue is produced by phosgenation of toluene diamine having an orthoisomer content of less than 0.1%.

7. The process of claim 1 in which the polyisocyanate used in b) is a polymeric MDI.

8. The process of claim 1 in which the diisocyanate or polyisocyanate used in b) is selected from the group consisting of diphenylmethane diisocyanate, toluene diisocyanate and polyphenyl polymethylene polyisocyanate.

9. The process of claim 1 in which a solvent is present in the toluene diisocyanate residue.

10. The clear, urethane-filled polyisocyanate produced by the process of claim 1.

11. The clear, urethane-filled polyisocyanate produced by the process of claim 8.

12. A urethane-filled polyisocyanate prepolymer produced by reacting the polyisocyanate of claim 10 with an isocyanate-reactive compound in an amount such that the NCO/OH ratio is from about 4:1 to about 34:1.

13. A polyurethane produced by reacting the urethane-filled polyisocyanate of claim 1 with an isocyanate-reactive compound in an amount such that the NCO/OH ratio is from about 0.8:1 to about 1.2:1.

* * * * *